R. SHEDENHELM.
INTERMITTENT GRIP DEVICE FOR MANURE SPREADERS AND THE LIKE.
APPLICATION FILED MAY 11, 1908.
1,170,005.
Patented Feb. 1, 1916.
2 SHEETS—SHEET 2.
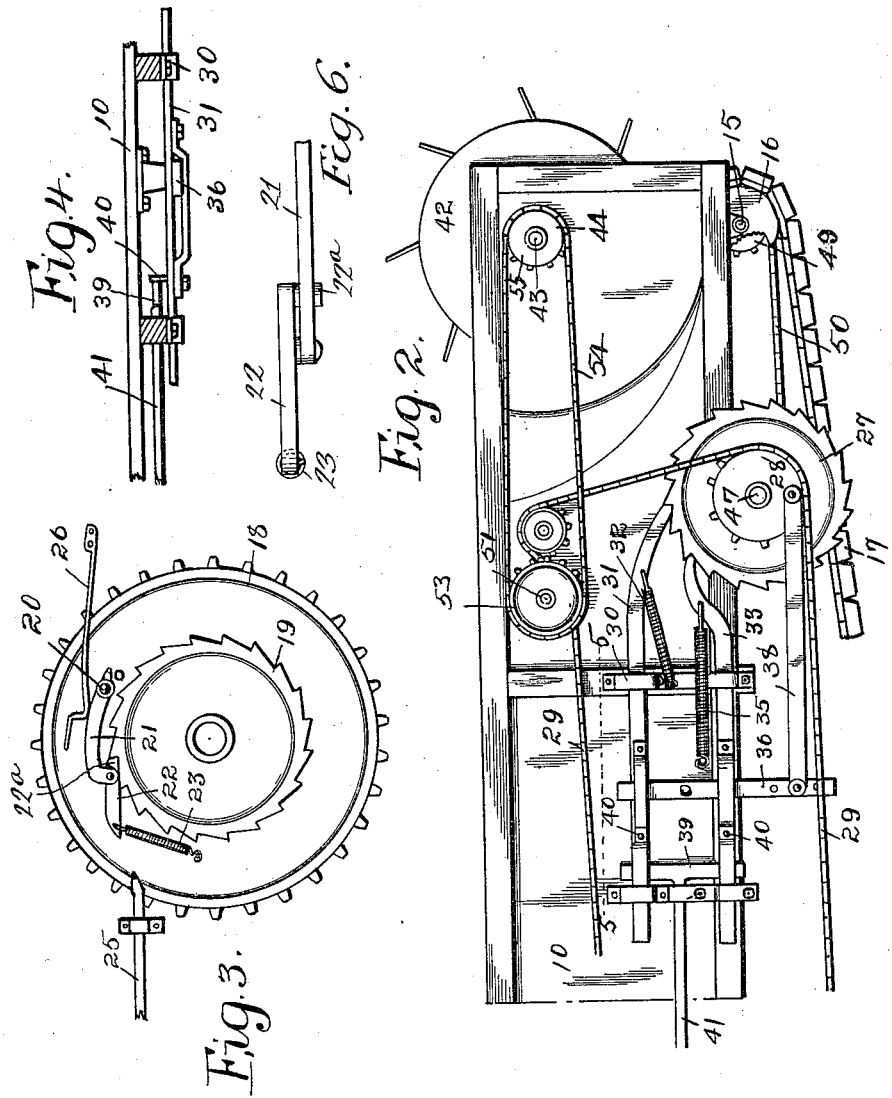

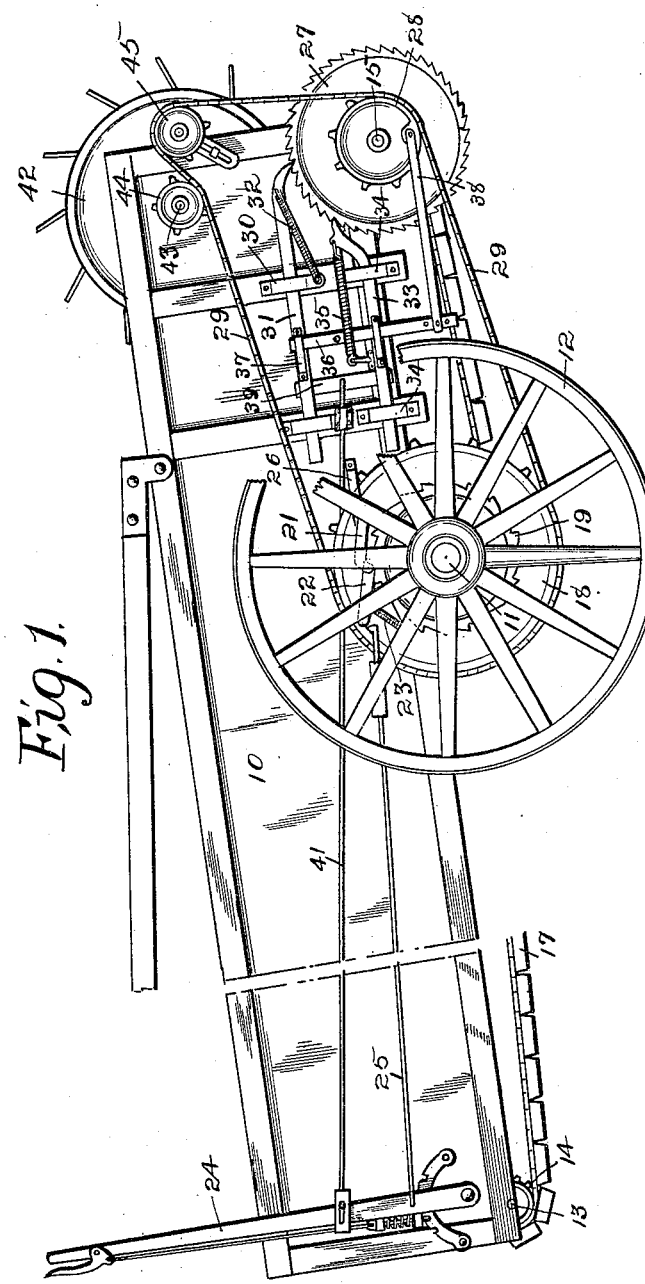

UNITED STATES PATENT OFFICE.

ROBERT SHEDENHELM, OF LADORA, IOWA, ASSIGNOR, BY MESNE ASSIGNMENTS, OF SIX-TENTHS TO HIMSELF AND FOUR-TENTHS TO H. S. BUTLER.

INTERMITTENT-GRIP DEVICE FOR MANURE-SPREADERS AND THE LIKE.

1,170,005.  Specification of Letters Patent.  Patented Feb. 1, 1916.

Application filed May 11, 1908. Serial No. 432,099.

*To all whom it may concern:*

Be it known that I, ROBERT SHEDENHELM, a citizen of the United States, residing at Ladora, in the county of Iowa and State of Iowa, have invented a new and useful Intermittent-Grip Device for Manure-Spreaders and the like, of which the following is a specification.

The object of my invention is to provide an intermittent grip device for manure spreaders and the like of simple, durable and inexpensive construction, in which the wagon bed is so arranged that as the load settles and moves rearwardly with the apron, it will not bind upon the sides of the wagon bed.

A further object is to provide improved means for regulating the speed of the apron, to suit the requirements, and for throwing the apron into or out of gear.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a side elevation of the device embodying my invention. Fig. 2 shows a side elevation of the rear end of machine. Fig. 3 shows an enlarged detail side view illustrating the sprocket wheel on the rear axle, and the means for throwing it into and out of gear, and Fig. 4 shows an enlarged detail sectional view taken on the line 5—5 of Fig. 2.

Referring to the accompanying drawings, I have used the reference numeral 10 to indicate the body portion of the wagon bed. The rear end portion of the wagon bed is supported upon an axle 11 having the supporting wheels 12 fixed thereto. In this application, I have not shown the means for supporting the forward end of the wagon bed. This means is fully illustrated and described in two companion applications for patents filed by me. At the forward end of the wagon bed is a shaft 13 having sprocket wheels 14 thereof, and at the rear end is a shaft 15 having sprocket wheels 16 thereon. An endless apron 17 of the ordinary kind is passed around these sprocket wheels.

Rotatably mounted upon the axle 11 is a large sprocket wheel 18, and fixed to the axle 11 adjacent to the sprocket wheel 18 is a ratchet wheel 19. Fixed to the sprocket wheel 18 is a pin 20 having a lever 21 pivoted to it. Adjacent to the sprocket wheel 18 is a pawl 22, which has one end pivoted to the lever 21, and is designed to engage the ratchet wheel 19. On the lever 21 is a lug 22ª arranged to engage the pawl 22 and to prevent the pawl 22 and the lever 21 from breaking upwardly at their pivotal point when they are substantially in line with each other. A spring 23 is provided for normally holding the pawl 22 in engagement with the ratchet wheel 19. Obviously, when the pawl is in engagement with the ratchet wheel, the sprocket wheel is rotated in unison with it, and when the pawl is out of engagement with the ratchet wheel, the sprocket wheel is then out of gear.

Pivoted to the forward end of the wagon bed is a lever 24, and connected to the lever is a rod 25 slidingly mounted, and having its rear end so arranged that when the lever 24 is moved to its rearward limit, the rear end of the rod 25 will be in the path of the pawl 22, between the point where the spring 23 is secured to said pawl and the point where said pawl is pivoted to the pawl 21, as shown by the dotted lines in Fig. 3 and thereby the pawl will be held out of engagement with the ratchet wheel.

I have provided for preventing a rearward movement of the sprocket wheel 18 when the pawl is out of engagement with the ratchet wheel, as follows: 26 indicates a spring hook fixed to the side of the wagon bed, and projected to its position where it will engage the pin 20 to prevent backward movement of the sprocket wheel. In the form of the invention shown in Fig. 1, I have fixed to the shaft 15 of the apron, a large ratchet wheel 27, and loosely mounted upon the shaft 15 is a sprocket wheel 28. This sprocket wheel is connected by means of a chain 29 with the sprocket wheel 18 on the driving axle. I provide for operating the ratchet wheel 27 as follows: Slidingly mounted in the guides 30 is a pawl 31, to engage the ratchet wheel 27. A spring 32 is connected to the said pawl, to normally hold it away from the ratchet wheel. Below the pawl 31 is a second similar pawl 33, slidingly mounted in guides 34, and provided with a spring 35 to normally hold it away from the ratchet wheel 27. These pawls are actuated as follows: Pivotally mounted between the pawls 31 and 30 is a lever 36, and fixed to each of the pawls is a metal strap 37 into which the lever is inserted. This strap is of such size that the lever may have a limited movement therein without moving the pawls, but when the lever strikes the end of either of the straps, it will force the pawl rearwardly, and thus actuate the ratchet wheel 27. The said lever is provided at its lower end with a pitman 38, adjustably pivoted to the lever, and connected to the sprocket wheel 28. In order to regulate the speed of the sprocket wheel 27 relative to that of the driving axle, I provide a slide bar 39 arranged in the path of the pins 40 that are fixed to the pawls 31 and 33. This slide bar is connected with a rod 41, which rod has a limited sliding connection with the lever 24. Hence, by moving said slide bar 39 toward the rear of the wagon bed, the forward movement of the pawls is limited. Hence, said device may be so arranged that upon each movement of the lever 36, the pawls will move forwardly only one tooth space of the ratchet wheel. Then, if the slide bar 39 is moved forwardly, the pawls may be moved during each operation of the lever 36 either two or more tooth spaces of the ratchet wheel 27.

In the form of the invention shown in Fig. 1, I have shown a spreading cylinder 42 of ordinary construction, fixed to a cylinder shaft 43 provided with a sprocket wheel 44. This sprocket wheel is engaged by the chain 29, which is held against its under surface by an adjustable idler 45. I have also provided for driving the spreading cylinder as follows: On the side of the wagon bed is a short shaft 51 having a sprocket wheel 52 fixed to it, and in engagement with the sprocket chain 29. Fixed to the same shaft 51 is a sprocket wheel 53, connected by a sprocket chain 54 with a sprocket wheel 55 on the shaft 43 of the spreading cylinder. In this way, the principle of the operation of the apron and the spreading cylinder are the same as before described herein, the extra sprocket gearing devices being simply provided for the purpose of accommodating themselves to the long spreading cylinder.

In practical use, it is obvious that the apron may be moved toward the rear of the wagon, without danger of the load binding upon the sides of the wagon bed. The speed of the apron relative to the advance of the machine may be readily and easily controlled by the lever 24, and if it is desired to throw the apron and the cylinder out of gear, this may be done by rearward movement of the lever 24. The changes in speed of the apron will not affect the movement of the spreading cylinder. Furthermore, the mechanism is all of simple, durable and inexpensive construction.

I claim as my invention:

1. In a device of the class described, a shaft, a sprocket wheel loosely mounted on said shaft, a ratchet wheel fixed to said shaft, two spring actuated pawls in engagement with the ratchet wheel, a lever fulcrumed between the pawls, and having a limited sliding connection with each pawl, a pitman pivoted to the sprocket wheel and to said lever, and means for driving the sprocket wheel.

2. In a device of the class described, a shaft, a sprocket wheel loosely mounted on said shaft, a ratchet wheel fixed to said shaft, two spring actuated pawls in engagement with the ratchet wheel, a lever fulcrumed between the pawls, and having a limited sliding connection with each pawl, a pitman pivoted to the sprocket wheel and to said lever, a bar arranged to limit the movement of the spring actuated pawls away from the ratchet wheel, and a lever for adjusting said bar.

3. In a device of the class described, a shaft, a ratchet wheel fixed to said shaft, two spring actuated pawls in engagement with the ratchet wheel, a lever fulcrumed between the pawls and having a limited sliding connection with each pawl, a pitman connected with said lever, and means for operating the pitman.

4. In a device of the class described, a shaft, a ratchet wheel fixed to said shaft, two spring actuated pawls in engagement with the ratchet wheel, a lever fulcrumed between the pawls and having a limited sliding connection with each pawl, a pitman connected with said lever, means for operating the pitman and an adjustable stop device for limiting the movement of the pawl away from the ratchet wheel.

Des Moines, Iowa, March 27th, 1908.

ROBERT SHEDENHELM.

Witnesses:
 RALPH ORWIG,
 A. F. HAGUE.

Copies of this patent may be obtained for five cents each, by addressing the "Commissioner of Patents, Washington, D. C."